No. 895,292. PATENTED AUG. 4, 1908.
M. A. NEELAND.
BLOWING ENGINE INLET VALVE.
APPLICATION FILED JULY 22, 1904.

4 SHEETS—SHEET 2.

WITNESSES
Thomas W. Bakewell

INVENTOR
Marvin A. Neeland

No. 895,292. PATENTED AUG. 4, 1908.
M. A. NEELAND.
BLOWING ENGINE INLET VALVE.
APPLICATION FILED JULY 22, 1904.

4 SHEETS—SHEET 4.

WITNESSES

INVENTOR
Marvin A. Neeland

UNITED STATES PATENT OFFICE.

MARVIN A. NEELAND, OF YOUNGSTOWN, OHIO.

BLOWING-ENGINE INLET-VALVE.

No. 895,292.

Specification of Letters Patent.

Patented Aug. 4, 1908.

Application filed July 22, 1904. Serial No. 217,637.

*To all whom it may concern:*

Be it known that I, MARVIN A. NEELAND, of Youngstown, Mahoning county, Ohio, have invented a new and useful Blowing-Engine Inlet-Valve, of which the following is a full, clear, and exact description, reference being had to the accompanying drawings, forming part of this specification, in which—

Figure 1:
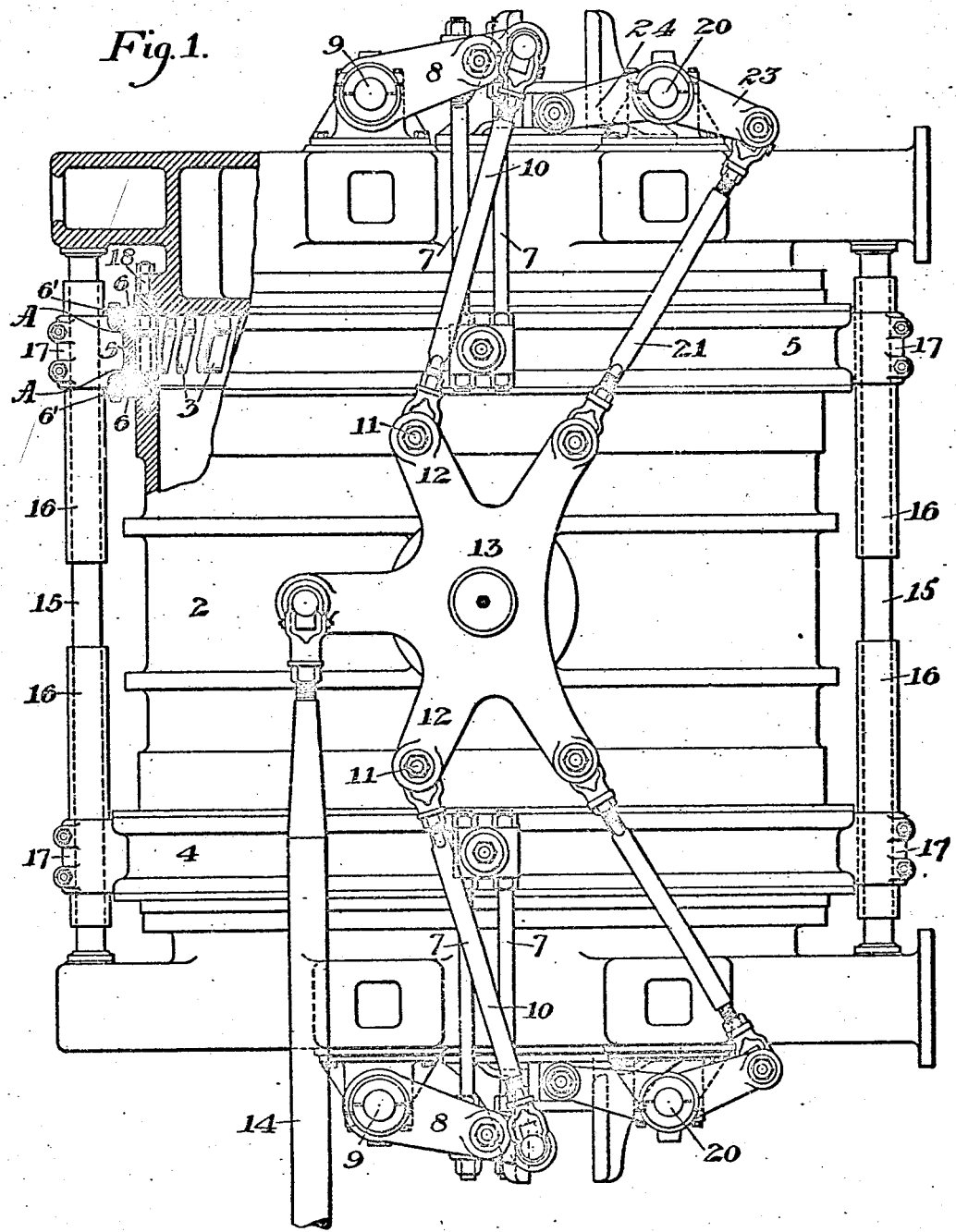
Figures 2, 3:
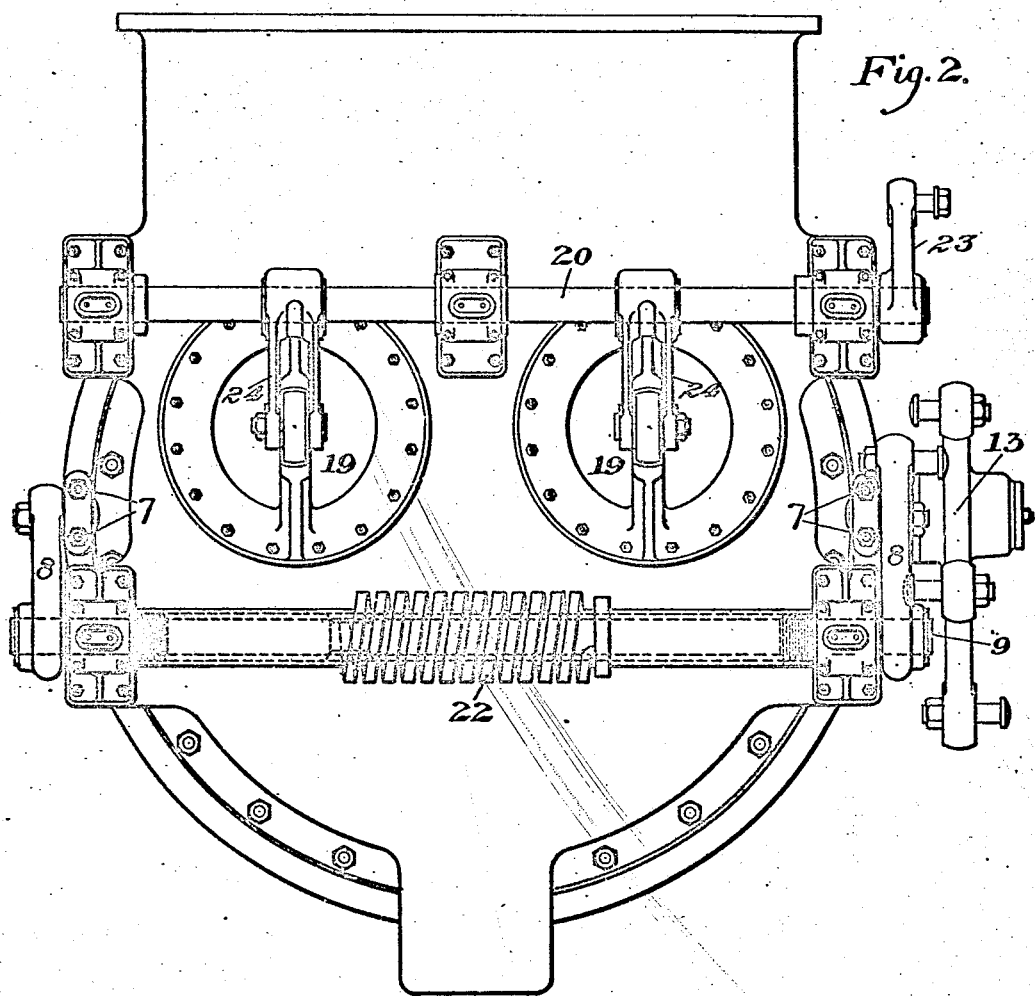
Figure 4:
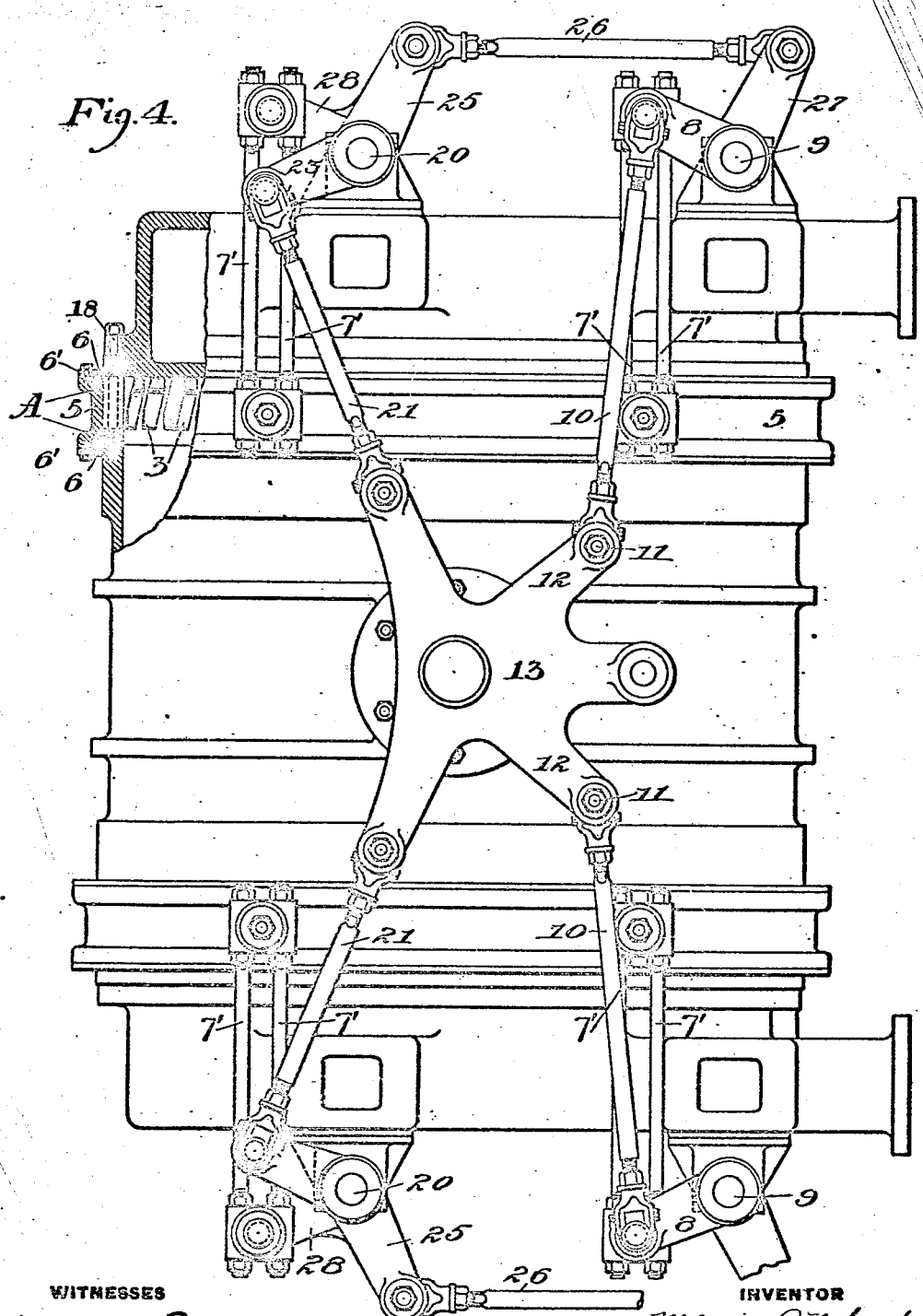
Figure 5:
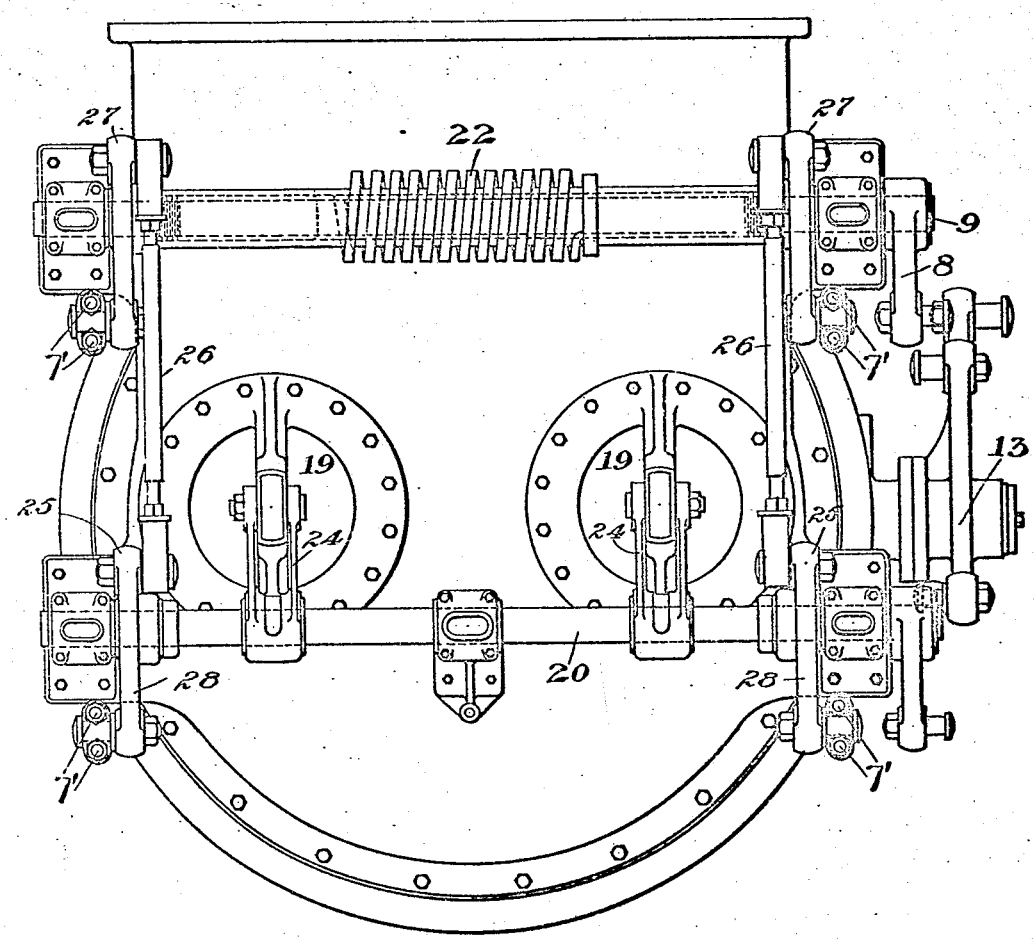

Figure 1 is a side elevation partly broken away of a blowing engine constructed in accordance with my invention. Fig. 2 is an end elevation. Fig. 3 is a detail view of the valve and seat. Figs. 4 and 5 are similar views to Figs. 1 and 2, showing a modified form of apparatus.

My invention relates to that class of compressors or blowing engines wherein an annular row of circumferential ports is provided at each end of the cylinder, these ports being controlled by reciprocating valves which move over them. Heretofore in such inlet valves the valves at the two ends have been connected together so that they move synchronously and simultaneously in the same direction so that one of such valves is moved through its functional stroke of admitting and cutting off air to the cylinder while the other is moving through that portion of its stroke in which the valve port is closed, after it has performed its function. In such case where the valves are rigidly connected together each must move at the same speed as the other at all times and each must travel through a distance equal to at least double the working width of the ports, so that each valve may fully uncover its ports. The momentum at the ends of a stroke in such system is large, and the travel is excessive. The piston speed of blowing engines and compressors is being increased rapidly, and this requires larger port openings. Consequently the travel of the valves must be increased, and in the connected valve system above referred to, the amount of travel of the valves and their momentum are excessive.

It is the object of the present invention to overcome the difficulties hereinbefore enumerated, and in particular to provide for actuating the valves independently of one another, whereby the valves may be moved with a varying velocity so as to reduce the momentum for the purpose of reducing, as far as possible, the strains upon the engine, incident to the movements of valves with high velocity. In this connection, it is proposed to impart the highest rate of speed to each valve at the end of its opening movement, and to reduce the rate of movement of the valve to the minimum at the end of its closing movement. By this arrangement, one valve is moving at its maximum rate when the other valve is moving at its minimum rate, and consequently the combined momentum of the two valves is little if any greater than the momentum of one of the valves, and it is in this respect that valve momentum is reduced.

While the valves may be operated in various ways, according to the present invention it is proposed to operate them from a wrist-plate by means of toggle connections between the plate and the valves.

There is a limit to the size of blowing engines, and the increase in the capacity thereof must necessarily be by way of an increase in the piston speed, whereby a greater number of compressions are made a minute. The faster the piston moves, the quicker it is necessary to admit the air which is to be compressed on the return stroke. This necessitates a large port opening, which I provide by means of rows of inlet ports extending entirely around the circumference of the cylinder at each end thereof.

While blowing engine practice requires a constantly increasing piston speed, not only for increasing the capacity of the engine, but because it is now the common practice to operate blowing engines by means of explosive engines rather than steam engines, for the reason that the exhaust gases from blast furnaces may be successfully employed in running explosive engines; it has heretofore been difficult if not impossible to meet the requirement of increased piston speed, owing to the weight and momentum of the inlet valves required to control the relatively large inlet ports, it, of course, being understood that the valves must move at a speed proportional to that of the piston. These difficulties are entirely overcome by the present invention, which provides for the necessary increased area of the inlet ports and also provides for moving the valves independently of one another so as to have one valve substantially at rest while the other is in motion, thereby to reduce valve momentum, and thus adapt the valve mechanism for a very high piston speed.

In casting a large compression cylinder with circumferential inlet ports at each end, any defects in the ported ends of the cylinder of course destroys the usefulness of the entire cylinder, and therefore it is an important object of the present invention to form the ports in rings independently of the cylinder, whereby any defects in the casting of the rings will not require the recasting of the entire cylinder.

In connection with the feature of forming port rings independent of the cylinder, it is also proposed to provide for connecting the cylinder head to the cylinder in such a manner that tension upon the heads will be transferred to the cylinder independently of the rings, thereby to avoid damaging the latter by the pressure upon the cylinder heads.

In the drawings, 2 represents the cylinder having an annular row of ports 3 at its end portions. I have shown these ports as formed in rings which are bolted to the cylinder, but they may be formed in any desirable manner. Over the ports slide the two ring valves 4 and 5. These valves are provided with packing rings 6 at each side held by removable cover plates 6'; and the ports 3 are preferably arranged with inclined bridges between them as shown in Fig. 3. Passages A preferably lead back of the packing rings to balance the pressure upon them. Each valve is connected to rock arms 8 secured to the opposite ends of rock shafts 9, by means of links 7 each of which is pivotally secured to the valve by a pivot pin a and pivotally connected with the rock arm by a pivot pin b. These rock shafts are mounted in suitable bearings upon the heads of the cylinder at each end, and at one end of the rock shaft the arm 8 is extended and pivotally connected with the toggle member 10 which leads to a pivotal connection 11, with the toggle member 12 of the wrist plate 13. The two members 10 and 12 form a toggle joint, the members being in a straight line at a time when the valve is closed. The wrist plate 13 is rocked by pivotal connection with an eccentric rod 14 which leads to the eccentric or crank on the main shaft of the engine, the eccentric being set at right angles to the crank for driving the main piston.

For guiding the valves and to prevent tilting and binding, I may use the devices shown in Figs. 1 and 2, in which each valve has two links 7, connected respectively at diametrically opposite points of the valve; and guiding posts 15 are provided which are rigidly secured at their ends to the heads of the cylinder. The valves have clamping portions 17 bolted to tubular guides 16 which are mounted on the guiding posts 15. I prefer, however, to use the device shown in Figs. 4 and 5 in which the posts are dispensed with and each valve is connected to the rock-arms by links 7' connected with the valve at three or more points. In the drawings I show four such links and four points of support. This mechanism also causes the valves to move independently and without tilting and binding.

Around the rock shaft 9 is a coil spring 22, one end of which is secured to the shaft while the other end is secured to the cylinder head. This spring is so arranged that in moving the valve from an intermediate position throughout either end of its stroke the spring is distorted. Hence, this spring absorbs the momentum of the valve and thereby makes its action easier.

A feature of my invention which is of advantage lies in making the inlet ports in rings which are separate from the cylinder. I am thus able to cast the cylinder in one plain piece and will not lose the whole casting by an imperfection in the port portion thereof. These port-containing rings are preferably fitted against the ends of the cylinder with a tongue and grooved joint as shown, and are preferably secured by bolts 18 which extend through the cylinder heads and through the port rings into the cylinder casting.

It will here be explained that, as best indicated in Fig. 3 of the drawings, the annular port member is made up of spaced ring sections, connected by obliquely disposed posts or webs 3ª, which define the ports 3. The ring sections and the webs or posts are pierced by openings 18ª, disposed at substantially right angles to the top and bottom of the port member for the reception of the bolts 18. The purpose of having the posts or webs disposed diagonally is to produce a uniform wear upon the packing rings. Experience has shown that diagonally disposed webs or posts are weak when subjected to tensile strain, for the reason that such posts or webs are necessarily small in cross section to reduce port clearance and obtain sufficient port area. By the employment of the fastenings 18 passing through the openings 18ª, it is apparent that the head of the cylinder is directly connected to the cylinder, and when the cylinder head is under tension, the strain is taken up by the fastenings 18 and the cylinder, while the annular port member is not subjected to any strain whatsoever. It will here be explained that the fastenings 18 tend to place the posts or webs between the ports under compression.

The outlet valves may be of any desirable form, and I have shown two of them at 19 actuated by connection with rock shaft 20 connected by rods 21 with the wrist plate, said rods and shaft in the arrangement shown in Figs. 4 and 5 also forming part of the operating means for the inlet valve.

In the operation of the engine, as the piston moves from one end of the cylinder on its suction stroke, the valve at said end of the cylinder is moved rapidly to open position. The valve is then reversed and moved quickly through the closing portion of its stroke, reaching its closed position as the piston reaches the end of said suction stroke. At this time the toggle joint in the connections begins to approach its straight line position, and the movement is therefore slow as the valve moves back and forth through the remainder of that portion of its stroke wherein the valve port is closed, the toggle passing from one angle through the straight line to the opposite angle. Through this closed portion of the stroke the piston is returning on its compression stroke and forcing the air out through the outlet valves at this end, also drawing in air from the opposite end, the inlet valve at which end is moving through the same opening and closing cycle above described.

Many variations may be made in the arrangement of the ring valves, and their actuating connections without departing from my invention.

I claim:—

1. A blowing engine or compressor cylinder having circumferential ports at its end, a ring valve controlling said ports, and connections for said valve arranged to move it through a less distance during the portion of its stroke while its ports are closed than during the opening and closing portion of its stroke, substantially as described.

2. A blowing engine or compressor having circumferential ports at its end, a ring valve controlling said ports, and a toggle joint connection arranged to move the valve through a shorter distance during the portion of its stroke while its ports are closed than the distance traveled during the opening portion of its stroke, substantially as described.

3. In a blowing engine or compressor having circumferential ports at its end, a ring valve controlling said ports, and a toggle joint arranged to reciprocate said valve, said toggle joint members being in a straight line when the valve is in closed position, substantially as described.

4. A blowing engine or compressor cylinder having a series of circumferential ports at each of its ends, ring valves, one of such valves controlling each series of said ports, and connections for said valves arranged to move them through a less distance during that portion of their strokes when their ports are closed than during the opening and closing portions of their strokes, said connections also operating one of the valves at its maximum velocity and simultaneously actuating the other valve at its minimum velocity; substantially as described.

5. A blowing engine or compressor cylinder having its end portion formed as a separate ring provided with ports, and bolts extending through the cylinder ring between the ports thereof and into the cylinder body, substantially as described.

6. A cylinder having circumferential ports at its end, a valve moving over said ports, and a head secured to said cylinder by bolts extending into the cylinder body between adjacent ports, substantially as described.

7. A blowing engine or compressor cylinder having circumferential ports at its ends, ring valves movable over said ports, and heads connected to the cylinder by bolts which are connected to that portion of the cylinder which is between its end ports, substantially as described.

8. A cylinder having circumferential ports, an annular sliding valve, packing rings on the valve at opposite sides of the ports when the valve is closed, and means admitting pressure behind the rings to balance them, substantially as described.

9. A cylinder having circumferential ports, a reciprocating annular valve arranged to travel over the said ports, and having a packing ring, and means for admitting air pressure behind said ring to balance it, substantially as described.

10. In a blowing engine, a cylinder having circumferential ports in its opposite end portions, posts extending between said ports, and bolts or connectors arranged to connect the cylinder parts on opposite sides of the ports and tending to place the posts under compression, substantially as described.

11. In a blowing engine, a cylinder having circumferential ports in the end portions of its wall, posts between the ports, and bolts tending to place the posts under compression, substantially as described.

12. In a blowing engine, a cylinder having circumferential ports in the end portions of its walls, posts between the ports, and bolts extending through the cylinder head and arranged to relieve tension from the posts, substantially as described.

13. A cylinder having circumferential ports formed in a separate ring near th end of the cylinder, and connectors between the cylinder portions on the opposite sides of the ports and arranged to relieve the tension on the posts due to air pressure, substantially as described.

14. In a blowing engine, a cylinder having its end portions formed as separate rings with ports therein, and bolts arranged to secure the head to the cylinder, said bolts connecting to the cylinder proper on the opposite sides of the ports so that they receive the tensile strain, substantially as described.

15. A blowing engine having a compressor cylinder provided at each end with an annular series of ports in its circumference, an annular valve for each series of ports, and operating means including mechanism for moving one valve at its maximum velocity and simultaneously moving the other valve at its minimum velocity, substantially as described.

16. A blowing engine having a compressor cylinder provided at each end with an annular series of ports in its circumference, an annular valve for each series of ports, and valve operating means including toggle joints arranged to impart the maximum velocity to one valve and simultaneously impart the minimum velocity to the other valve, substantially as described.

17. A blowing engine having its cylinder provided with circumferential ports, posts having inclined faces between the ports, bolts or connectors arranged to receive the tensile strain due to air pressure, and a ring valve having packing rings movable over the ported portion of the cylinder, substantially as described.

In testimony whereof, I have hereunto set my hand.

MARVIN A. NEELAND

Witnesses:
THOMAS W. BAKEWELL,
H. M. CORWIN.